United States Patent
Zhu et al.

(10) Patent No.: US 10,988,818 B2
(45) Date of Patent: Apr. 27, 2021

(54) EFFICIENT LONG-SERVICE-LIFE BLOWING METHOD AND SYSTEM FOR VANADIUM EXTRACTION-DECARBURIZATION DUPLEX CONVERTERS

(71) Applicant: UNIVERSITY OF SCIENCE AND TECHNOLOGY BEIJING, Beijing (CN)

(72) Inventors: Rong Zhu, Beijing (CN); Shaoyan Hu, Beijing (CN); Kai Dong, Beijing (CN); Guangsheng Wei, Beijing (CN); Haoran Ma, Beijing (CN); Weifeng Li, Beijing (CN); Yun Zhou, Beijing (CN); Zhihui Li, Beijing (CN); Wenhe Wu, Beijing (CN); Baochen Han, Beijing (CN); Chao Feng, Beijing (CN); Rongfang Su, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 16/926,483

(22) Filed: Jul. 10, 2020

(65) Prior Publication Data
US 2020/0340070 A1    Oct. 29, 2020

Related U.S. Application Data

(63) Continuation-in-part of application No. PCT/CN2019/090720, filed on Jun. 11, 2019.

(30) Foreign Application Priority Data

Nov. 7, 2018 (CN) .......................... 201811319213.5

(51) Int. Cl.
*C21C 5/30* (2006.01)
*B01D 53/38* (2006.01)
(Continued)

(52) U.S. Cl.
CPC ................ *C21C 5/30* (2013.01); *B01D 53/38* (2013.01); *B01D 53/76* (2013.01); *C01G 31/02* (2013.01);
(Continued)

(58) Field of Classification Search
CPC .. C01B 13/16; C21C 5/28; C21C 5/35; C21C 5/38
(Continued)

(56) References Cited

U.S. PATENT DOCUMENTS

2012/0213684 A1    8/2012 Wu et al.

FOREIGN PATENT DOCUMENTS

CN   102127613 A  *  7/2011
CN   102251070 A     11/2011
(Continued)

OTHER PUBLICATIONS

NPL: CN102127613A on-line translation, Jul. 2011 (Year: 2011).*
NPL: CN108425024A-translation (online) Aug. 2018 (Year: 2018).*

*Primary Examiner* — Jie Yang
(74) *Attorney, Agent, or Firm* — Novick, Kim & Lee, PLLC; Allen Xue (57) ABSTRACT

An efficient long-service-life blowing method include the steps of introducing vanadium extraction converter flue gas and decarburization converter flue gas into an oxygen combustor; obtaining first-purity $CO_2$—$N_2$ mixed gas through the vanadium extraction converter flue gas; obtaining second-purity $CO_2$—$N_2$ mixed gas through the decarburization converter flue gas; obtaining $O_2$—$CO_2$—$N_2$ mixed gas through the decarburization converter flue gas; obtaining (Continued)

first-purity $CO_2$ gas through the second-purity $CO_2$—$N_2$ mixed gas; and using the first-purity $CO_2$—$N_2$ mixed gas for bottom blowing of the vanadium extraction converter, using the second-purity $CO_2$—$N_2$ mixed gas as a carrier gas for blowing iron ore powder into the vanadium extraction converter, and using the $O_2$—$CO_2$—$N_2$ mixed gas and the first-purity $CO_2$ gas as a carrier gas for bottom blowing of the decarburization converter and bottom injecting of lime powder into the decarburization converter.

4 Claims, 3 Drawing Sheets

(51) Int. Cl.
*B01D 53/76* (2006.01)
*C01G 31/02* (2006.01)
*C21C 5/36* (2006.01)
*C21C 5/46* (2006.01)

(52) U.S. Cl.
CPC .................. *C21C 5/36* (2013.01); *C21C 5/46* (2013.01); *B01D 2258/025* (2013.01); *B01D 2258/0283* (2013.01)

(58) Field of Classification Search
USPC .......................................................... 75/556
See application file for complete search history.

(56) References Cited

FOREIGN PATENT DOCUMENTS

| | | | |
|---|---|---|---|
| CN | 104673956 A | | 6/2015 |
| CN | 104673959 A | | 6/2015 |
| CN | 105907914 A | | 8/2016 |
| CN | 107130079 A | | 9/2017 |
| CN | 107151724 A | | 9/2017 |
| CN | 108425024 A | * | 8/2018 |
| CN | 109234490 A | | 1/2019 |
| JP | S602617 A | | 1/1985 |

* cited by examiner

EFFICIENT LONG-SERVICE-LIFE BLOWING METHOD AND SYSTEM FOR VANADIUM EXTRACTION-DECARBURIZATION DUPLEX CONVERTERS

FIELD

The present disclosure belongs to the technical field of vanadium-containing molten iron steelmaking, and particularly relates to an efficient long-service-life blowing method and system for vanadium extraction-decarburization duplex converters.

BACKGROUND

In order to recycle vanadium from vanadium-containing molten iron, a vanadium extraction-decarburization converter duplex process is generally adopted at home and abroad. Firstly, the vanadium-containing molten iron is charged into a special vanadium extraction converter, vanadium in the vanadium-containing molten iron is oxidized into vanadium slag by oxygen. Then the vanadium slag obtained from the vanadium extraction converter is used for producing vanadium compounds; and the molten semi-steel is charged into a decarburization converter for dephosphorization, decarburization and heating treatment to obtain qualified molten steel for normal steelmaking production. By a vanadium extraction-decarburization converter duplex steelmaking process, vanadium can be recycled from the vanadium-containing molten iron, and the molten semi-steel after vanadium extraction treatment can also be utilized reasonably. Therefore, this process has become the most widely used vanadium-containing molten iron treatment process at home and abroad.

Vanadium extraction from molten iron is a selective oxidation reaction process, in order to achieve the ideal conversion rate of vanadium oxidation and obtain high residual carbon content in semi-steel, the key is to control molten bath temperature and enhance stirring power to create good thermodynamic and kinetic conditions for vanadium extraction and carbon preservation in the vanadium extraction converter. In order to control the temperature of the molten bath, researchers propose a smelting method for blowing iron ore powder into converter with nitrogen as a carrier gas. However, because nitrogen is inert gas, no chemical reaction occurs, no chemical heat absorption effect is achieved after the nitrogen blown into converter, neither can the temperature of the molten bath be controlled effectively, nor can a stable mushroom-shaped loose porous medium area formed at the tip of powder injecting lance to protect the lance. Moreover, the main component of the iron ore powder is iron oxide, if the iron ore powder blowing system is unreasonable, the content of iron oxide in final slag is high, the grade of vanadium slag is reduced, and resource waste is also caused. At present, in order to enhance the molten bath stirring of the vanadium extraction converter, a few bottom blowing bricks are usually installed at the bottom of vanadium extraction converter, and the bottom blowing gas is generally nitrogen. In order to reduce the erosion rate of bottom blowing brick, gas flow rate of each brick is very small, and the number of bottom blowing bricks is large.

In vanadium extraction converter, silicon and manganese in molten iron are oxidized preferentially, the oxidized silicon and manganese enter the vanadium slag, the molten semi-steel subjected to vanadium extraction hardly contains silicon, the content of manganese is also quite low, in the subsequent decarburization converter smelting process, due to lack of silicon and manganese, the basicity of the slag is high, the slag is difficult to melt, the dephosphorization difficulty is high, it is even necessary to add ferrosilicon into the converter to ensure the end phosphorus ingredient to be qualified, moreover, the slag has high basicity and easy to dry again, caused an oxygen lance is easy to nodulate, as a result, the service life of the oxygen lance is shortened, water leakage of the oxygen lance may be caused to lead to explosion accidents, and the problem has hitherto been difficult to solve effectively. The optimal method for solving the problem is to bottom-blow lime powder into the decarburization converter, direct injecting of the lime powder into the metal molten bath from the bottom of the converter can obviously increase the slag-gold reaction area, the dephosphorization effect is greatly improved, stirring of the molten bath is enhanced, the height of the oxygen lance is increased, and the service life is prolonged. However, the carrier gas for bottom blowing the lime powder is usually pure oxygen, and using oxygen as a carrier gas results in high temperature at the bottom of the converter, fast burning loss of a refractory material on the bottom of the converter and short service life of the bottom of the converter.

A lot of researches show that the stirring energy of $CO_2$ as bottom blowing gas is higher than the stirring energy of $N_2$ and Ar, and a heat absorption reaction occurs after $CO_2$ is injected into the molten bath, the temperature of the molten bath is stabilized favorably, bottom blowing air-permeable bricks and a powder injecting lance are protected, pure oxygen is replaced with $O_2$—$CO_2$ as a carrier gas for bottom blowing the lime powder, thus, the temperature of the bottom of the converter can be reduced, burning loss of the refractory material on the bottom of the converter is relieved, and the service life of the bottom of the converter is prolonged.

However, most iron and steel enterprises do not have the capability of preparing $CO_2$ and cannot obtain a $CO_2$ gas source; moreover, conventional carbon dioxide recycling equipment is high in investment and high in operation cost, so that the carbon dioxide obtaining cost is high, and the economic benefit of application of carbon dioxide is reduced.

Vanadium extraction converter flue gas and decarburization converter flue gas are mainly composed of CO, $CO_2$ and $N_2$, the content of CO in the vanadium extraction converter flue gas is low, the calorific value is low, and the vanadium extraction converter flue gas is usually directly diffused, energy waste is caused, and furthermore, carbon emission is increased; and the content of CO in the decarburization converter flue gas is high, and thus, the decarburization converter flue gas is usually discharged after being combusted as fuel.

SUMMARY OF THE INVENTION

In order to solve the foregoing problems, the present disclosure provides an efficient long-service-life blowing method and system for vanadium extraction-decarburization duplex converters in combination with the principles and effects of application of $CO_2$ in steelmaking, converter flue gas produced by a vanadium extraction converter and a decarburization converter is utilized, $CO_2$ gas in various purity ranges is obtained after different combustion processes are carried out, and is respectively used for blowing of the vanadium extraction converter and blowing of the decarburization converter to improve the vanadium oxidation rate of the vanadium extraction converter, improve the dephosphorization effect of the decarburization converter, and meanwhile, prolong the service lives of the vanadium extraction converter and the decarburization converter and thus, the problems of poor stirring of the vanadium extraction converter, low vanadium oxidation rate, poor dephosphorization effect of the decarburization converter and short service life of an oxygen lance existing in a vanadium extraction-decarburization converter duplex process are solved.

According to a first aspect of the present disclosure, an efficient long-service-life blowing method for vanadium extraction-decarburization duplex converters is provided, a staged control strategy is adopted in a smelting process of the vanadium extraction converter and the decarburization converter, the proportion and flow of different gas media are adjusted in stages, and the method includes the following steps:

separately introducing vanadium extraction converter flue gas and decarburization converter flue gas into an oxygen combustor;

completely combusting the vanadium extraction converter flue gas in an oxygen atmosphere to obtain first-purity $CO_2$—$N_2$ mixed gas;

completely combusting the decarburization converter flue gas in an oxygen atmosphere to obtain second-purity $CO_2$—$N_2$ mixed gas;

carrying out oxygen-excess combustion on the decarburization converter flue gas in an oxygen atmosphere to obtain $O_2$—$CO_2$—$N_2$ mixed gas;

introducing a first part of the second-purity $CO_2$—$N_2$ mixed gas into a purification device to obtain first-purity $CO_2$ gas; and using the first-purity $CO_2$—$N_2$ mixed gas for bottom blowing of the vanadium extraction converter, using a second part of the second-purity $CO_2$—$N_2$ mixed gas as a carrier gas for blowing iron ore powder into the vanadium extraction converter, and using a third part of the second-purity $CO_2$—$N_2$ mixed gas, the $O_2$—$CO_2$—$N_2$ mixed gas and the first-purity $CO_2$ gas as a carrier gas for bottom blowing of the decarburization converter and bottom injecting of lime powder into the decarburization converter.

Further, the gas media with different purities are separately used in different smelting stages of the vanadium extraction converter and the decarburization converter as follows particularly:

because the requirements of steel tapping of the vanadium extraction converter on the nitrogen content of molten steel are not high, in the smelting process of the vanadium extraction converter, the first-purity $CO_2$—$N_2$ mixed gas is bottom-blown in the whole process, and the bottom blowing intensity is 0.03-0.3 $Nm^3$/t/min;

in the early smelting stage and the middle smelting stage of the vanadium extraction converter, iron ore powder is injected and blown into the converter by taking the second part of the second-purity $CO_2$—$N_2$ mixed gas as a carrier gas, the temperature of a molten bath is stabilized, the gas supply intensity is 0.1-0.5 $Nm^3$/t/min, and the iron ore powder supply intensity is 0-2 kg/t/min;

blowing of the iron ore powder are stopped in the later smelting stage of the vanadium extraction converter to prevent the content of iron oxide in vanadium slag from being too high, a second part of the second-purity $CO_2$—$N_2$ mixed gas is continuously injected and blown, the gas supply intensity is 0.1-0.5 $Nm^3$/t/min, stirring of the molten bath is enhanced, the temperature of the molten bath is inhibited from rising too fast depending on the heat absorption effect of $CO_2$, the vanadium oxidation rate is increased, and the content of the iron oxide in the vanadium slag is reduced;

because the steel tapping of the decarburization converter has a high requirement on the nitrogen content of the molten steel, in the early smelting stage and the middle smelting stage of the decarburization converter, when lime powder is not injected and blown, the third part of the second-purity $CO_2$—$N_2$ mixed gas is bottom-blown, when the lime powder is injected and blown, the $O_2$—$CO_2$—$N_2$ mixed gas is used as a carrier gas to inject and blow the lime powder, excessive growth of a mushroom-shaped loose porous medium area is inhibited by utilizing the heat release effect of $O_2$, blockage of a bottom blowing injecting lance is avoided, the bottom blowing gas supply intensity is 0.5-1.5 $Nm^3$/t/min, the bottom blowing powder injecting intensity is 0-5 kg/t/min, the top blowing oxygen supply intensity is 2.0-4.0 $Nm^3$/t/min, and a top blowing lance height is 2.5-5.0 m; and in the later smelting stage of the decarburization converter, in order to prevent the nitrogen content of the molten steel from exceeding the standard, the first-purity $CO_2$ gas and industrially pure $O_2$ are mixed to serve as bottom blowing gas, the bottom blowing gas supply intensity is 0.5-1.5 $Nm^3$/t/min, the top blowing oxygen supply intensity is 2.0-4.0 $Nm^3$/t/min, the top blowing lance height is 2.0-4.0 m, top blowing oxygen supply is stopped 1-2 min before the end of blowing, and end point control is completed by bottom blowing of the first-purity $CO_2$ gas and the industrially pure $O_2$.

Further, in the first-purity $CO_2$—$N_2$ mixed gas, the volume content of $CO_2$ is 30-50%, the content of $N_2$ is 50-70%, and the total content of $O_2$ and CO is not higher than 2%;

in the second-purity $CO_2$—$N_2$ mixed gas, the volume content of $CO_2$ is 50-80%, the content of $N_2$ is 20-50%, and the total content of $O_2$ and CO is not higher than 2%;

a gas composition of the $O_2$—$CO_2$—$N_2$ mixed gas is controlled by adjusting the excess degree of oxygen in an oxygen combustion atmosphere, wherein the volume fraction of $O_2$ is 20-60%, the content of $CO_2$ is 20-65%, the content of $N_2$ is 10-40%, and the content of CO is lower than 0.1%; and in the first-purity $CO_2$ gas, the volume content of $CO_2$ is higher than 99%, and the total content of $O_2$ and CO are not higher than 1%.

Further, because the stirring effect of $CO_2$ is superior to that of $N_2$ under the condition that the bottom blowing flows are the same, after the first-purity $CO_2$—$N_2$ mixed gas is used as bottom blowing gas of the vanadium extraction converter, under the condition that the stirring effect of the molten bath is kept unchanged, the number of bottom blowing air-permeable bricks required by the vanadium extraction converter is reduced, 2-3 groups of bottom blowing pocket bricks are arranged on the bottom of the vanadium extraction converter, and one group of bottom blowing pocket bricks are used every time, the bottom blowing air-permeable bricks are mounted by drilling, bottom blowing stirring is provided, after the group of bottom blowing air-permeable bricks are eroded to a lower safety limit, the group of bottom blowing bricks are blocked by a bottom blowing quick-change mode, another group of bottom blowing pocket bricks are used, bottom blowing air-permeable bricks are mounted by drilling, bottom blowing stirring is provided, and multiple groups of bottom blowing pocket bricks are alternately used. On the premise of maintaining the stirring effect of the vanadium extraction converter, the integral service life of the bottom of the vanadium extraction converter is prolonged.

According to another aspect of the present disclosure, an efficient long-service-life blowing system for vanadium extraction-decarburization duplex converters is provided, and includes an oxygen combustor (1), a $CO_2$ purification device (2), a vanadium extraction converter (3), a decarburization converter (4), an iron ore powder blowing tank (5) and a lime powder blowing tank (6).

The oxygen combustor (1) includes a first combustion chamber, a second combustion chamber and a third combustion chamber, a flue gas source of the vanadium extraction converter is connected with the first combustion chamber through a first pipeline, a flue gas source of the decarburization converter communicates with the second combustion chamber and the third combustion chamber through a second pipeline, a first industrial oxygen source communicates with the first combustion chamber, the second combustion chamber and the third combustion chamber through a third pipeline, the first combustion chamber communicates with the vanadium extraction converter (3) through a first-purity $CO_2$—$N_2$ mixed gas pipeline, the second combustion chamber communicates with the decarburization converter (4) through an $O_2$—$CO_2$—$N_2$ mixed gas pipeline, and a second industrial oxygen source and the lime powder blowing tank (6) communicate with the $O_2$—$CO_2$—$N_2$ mixed gas pipeline between the second combustion chamber and the decarburization converter (4);

the third combustion chamber communicates with the vanadium extraction converter (3) through a second-purity $CO_2$—$N_2$ mixed gas pipeline, and the iron ore powder blowing tank (5) communicates with the second-purity $CO_2$—$N_2$ mixed gas pipeline between the third combustion chamber and the vanadium extraction converter (3), the third combustion chamber also communicates with the decarburization converter (4) through the second-purity $CO_2$—$N_2$ mixed gas pipeline, and a second industrial oxygen source and the lime powder blowing tank (6) communicate with the second-purity $CO_2$—$N_2$ mixed gas pipeline between the third combustion chamber and the decarburization converter (4), the third combustion chamber also communicates with the $CO_2$ purification device (2) through the second-purity $CO_2$—$N_2$ mixed gas pipeline, the $CO_2$ purification device (2) communicates with the decarburization converter (4) through a first-purity $CO_2$ gas pipeline, and the second industrial oxygen source and the lime powder blowing tank (6) communicate with the first-purity $CO_2$ gas pipeline between the $CO_2$ purification device (2) and the decarburization converter (4).

Further, the first-purity $CO_2$—$N_2$ mixed gas pipeline communicates with a bottom blowing device of the vanadium extraction converter (3).

Further, the second-purity $CO_2$—$N_2$ mixed gas pipeline communicates with an air inlet of the iron ore powder blowing tank (5), and an iron ore powder airflow outlet of the iron ore powder blowing tank (5) is connected with an iron ore powder blowing device of the vanadium extraction converter (3) through a pipeline.

Further, the $O_2$—$CO_2$—$N_2$ mixed gas pipeline, the second-purity $CO_2$—$N_2$ mixed gas pipeline, the first-purity $CO_2$ gas pipeline and the second industrial oxygen source communicate with an air inlet of the lime powder blowing tank (6), and a lime powder airflow outlet of the lime powder blowing tank (6) is connected with a lime powder blowing device of the decarburization converter (4) through a pipeline.

Further, a flow valve group is arranged on the first pipeline, the second pipeline and the third pipeline.

Further, 2-3 groups of bottom blowing pocket bricks are arranged on the bottom of the vanadium extraction converter.

The present disclosure has the beneficial effects that:

(1) $CO_2$ gas with different concentration ranges is prepared from the vanadium extraction converter flue gas and the decarburization converter flue gas at high efficiency and low cost, so that the $CO_2$ obtaining cost is reduced, and diversified blowing media can be provided for different metallurgical requirements;

(2) according to the smelting characteristics and smelting requirements of the vanadium extraction converter and the decarburization converter, $CO_2$ gas with different concentrations is selected, so that the metallurgical effect is improved, and the cost is reduced; and (3) by the strong stirring and temperature control effects of $CO_2$, the vanadium oxidation rate of the vanadium extraction converter is improved, the dephosphorization effect of the decarburization converter is improved, and meanwhile, the service lives of the vanadium extraction converter and the decarburization converter are prolonged.

BRIEF DESCRIPTION OF THE DRAWINGS

In FIG. 2: 1—oxygen combustor, 2—$CO_2$ purification device, 3—vanadium extraction converter, 4—decarburization converter, 5—iron ore powder blowing tank, and 6—lime powder blowing tank.

DETAILED DESCRIPTION OF THE EMBODIMENTS

In order to enable the objects, technical schemes and advantages of the present disclosure to be clearly understood, the present disclosure will be further described with reference to specific embodiments and the accompanying drawings below.

Aiming at the problems of a vanadium extraction-decarburization duplex converter steelmaking process, the vanadium extraction converter flue gas and the decarburization converter flue gas produced by the vanadium extraction converter and the decarburization converter are utilized, $CO_2$ gas in various purity ranges is obtained after different combustion processes are carried out, in combination with blowing process characteristics and requirements of the vanadium extraction converter and the decarburization converter, $CO_2$ gas with different purities is respectively used for bottom blowing stirring of the vanadium extraction converter, blowing of iron ore powder into the vanadium extraction converter and bottom blowing of lime powder into the decarburization converter, in a smelting process of the vanadium extraction converter and the decarburization converter, a staged control strategy is adopted, and the proportion and flow of the $CO_2$ gas with different purities are regulated in stages. The present disclosure is suitable for 30-350 tons of vanadium extraction-decarburization duplex converters, the vanadium extraction converter flue gas and the decarburization converter flue gas are recycled at high efficiency and low cost, and are respectively applied to different blowing procedures of the vanadium extraction converter and the decarburization converter, the vanadium oxidation rate of the vanadium extraction converter can be increased, the dephosphorization effect of the decarburization converter is improved, and meanwhile, the service lives of the vanadium extraction converter and the decarburization converter are prolonged.

Figure 1:
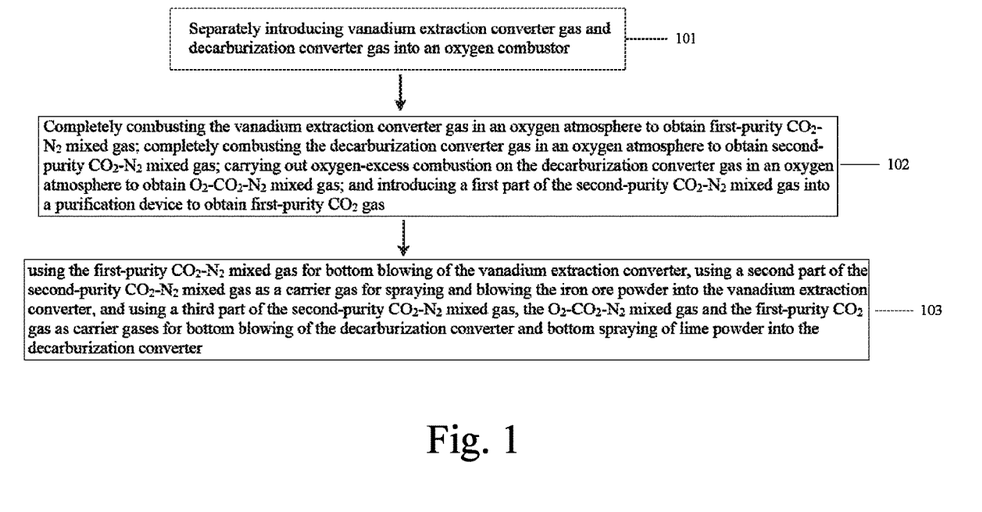
FIG. 1 is a flow chart illustrating an efficient long-service-life blowing method for vanadium extraction-decarburization duplex converters according to the present disclosure.

As shown in FIG. 1, the efficient long-service-life blowing method for the vanadium extraction-decarburization duplex converters according to the present disclosure includes the following steps:

step 101, the vanadium extraction converter flue gas and the decarburization converter flue gas are separately introduced into the oxygen combustor.

Step 102, the vanadium extraction converter flue gas is completely combusted in an oxygen atmosphere to obtain first-purity $CO_2$—$N_2$ mixed gas; the decarburization converter flue gas is completely combusted in an oxygen atmosphere to obtain second-purity $CO_2$—$N_2$ mixed gas; the decarburization converter flue gas is subjected to oxygen-excess combustion in an oxygen atmosphere to obtain $O_2$—$CO_2$—$N_2$ mixed gas; and a first part of the second-purity $CO_2$—$N_2$ mixed gas is introduced into a purification device to obtain first-purity $CO_2$ gas.

In the first-purity $CO_2$—$N_2$ mixed gas, the volume content of $CO_2$ is 30-50%, the content of $N_2$ is 50-70%, and the total content of $O_2$ and CO is not higher than 2%; in the second-purity $CO_2$—$N_2$ mixed gas, the volume content of $CO_2$ is 50-80%, the content of $N_2$ is 20-50%, and the total content of $O_2$ and CO is not higher than 2%; a gas composition of the $O_2$—$CO_2$—$N_2$ mixed gas is controlled by adjusting the excess degree of oxygen, wherein the volume fraction of $O_2$ is 20-60%, the content of $CO_2$ is 20-65%, the content of $N_2$ is 10-40%, and the content of CO is lower than 0.1%; and in the first-purity $CO_2$ gas, the volume content of $CO_2$ is higher than 99%, and the total content of $O_2$ and CO is not higher than 1%.

Step 103, the first-purity $CO_2$—$N_2$ mixed gas is used for bottom blowing of the vanadium extraction converter, a second part of the second-purity $CO_2$—$N_2$ mixed gas is used as a carrier gas for blowing iron ore powder into the vanadium extraction converter, and a third part of the second-purity $CO_2$—$N_2$ mixed gas, the $O_2$—$CO_2$—$N_2$ mixed gas and the first-purity $CO_2$ gas are used as a carrier gas for bottom blowing of the decarburization converter and bottom injecting of lime powder into the decarburization converter.

Figure 2:
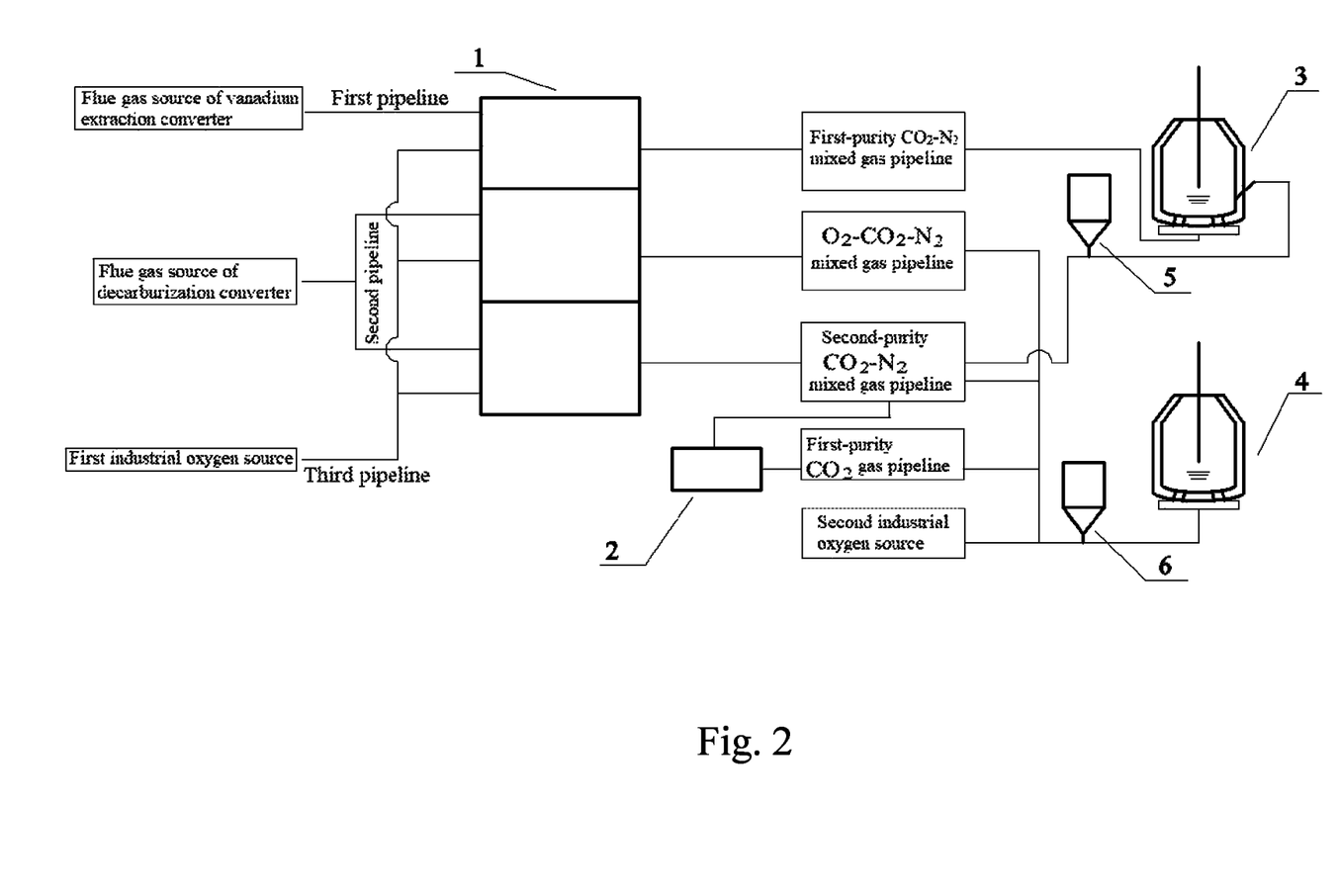
FIG. 2 is a schematic diagram of the efficient long-service-life blowing method for vanadium extraction-decarburization duplex converters according to the present disclosure.
Figure 3:
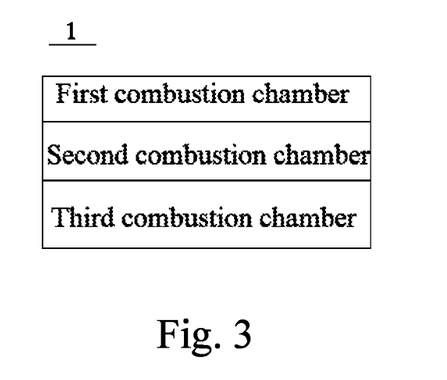
FIG. 3 is a schematic diagram of a structure of an oxygen combustor.

As shown in FIG. 2 and FIG. 3, the efficient long-service-life blowing system for vanadium extraction-decarburization duplex converters according to the present disclosure includes an oxygen combustor (1), a $CO_2$ purification device (2), a vanadium extraction converter (3), a decarburization converter (4), an iron ore powder blowing tank (5) and a lime powder blowing tank (6), the vanadium extraction converter flue gas, the decarburization converter flue gas and industrial oxygen are connected with the oxygen combustor (1) through pipelines, the oxygen combustor (1) generates first-purity $CO_2$—$N_2$ mixed gas, second-purity $CO_2$—$N_2$ mixed gas and $O_2$—$CO_2$—$N_2$ mixed gas, wherein one part of the second-purity $CO_2$—$N_2$ mixed gas enters the $CO_2$ purification device through a pipeline to produce first-purity $CO_2$ gas; the first-purity $CO_2$—$N_2$ mixed gas is connected with a bottom blowing device of the vanadium extraction converter (3) through a pipeline, one part of second-purity $CO_2$—$N_2$ mixed gas is connected with the iron ore powder blowing tank (5) through a pipeline, and iron ore powder airflow is connected with an iron ore powder blowing device of the vanadium extraction converter (3) through a pipeline; and one part of the second-purity $CO_2$—$N_2$ mixed gas, the $O_2$—$CO_2$—$N_2$ mixed gas, the first-purity $CO_2$ and the industrial oxygen are connected with the lime powder blowing tank (6) through a pipeline, and lime powder airflow is connected with a lime powder blowing device of the decarburization converter (4) through a pipeline; and the flows of a gas medium and solid powder in the system can be adjusted and metered through the valve group arranged on the pipelines.

Embodiment 1

In the embodiment, the method and system are applied to a 100-ton vanadium extraction-decarburization duplex converter process.

The converter flue gas generated by the vanadium extraction converter contains 20% CO, 15% $CO_2$ and the rest is $N_2$, and because the gas is low in calorific value, before the method and system are adopted, the vanadium extraction converter flue gas is diffused directly; the decarburization converter flue gas contains 60% CO, 20% $CO_2$ and the rest is $N_2$, and is stored in a gas cabinet. Before the method and system are adopted, eight bottom blowing air-permeable bricks are arranged on the bottom of the vanadium extraction converter, the gas supply intensity is 0.04 $Nm^3$/t/min, two inject lances for blowing iron ore powder are arranged on a side of the converter, the gas supply intensity is 0.2 $Nm^3$/t/min, the powder injecting intensity is 1.0 kg/t/min, and a carrier gas for bottom blowing and side blowing are $N_2$; and four bottom blowing injecting lances for blowing lime powder are arranged on the bottom of the decarburization converter, pure $O_2$ is used as a carrier gas for injecting powder, the bottom blowing gas supply intensity is 0.8 $Nm^3$/t/min, and the maximum powder injecting intensity is 3.0 kg/t/min.

After the method and system are applied, the vanadium extraction converter flue gas and the decarburization converter flue gas are separately introduced into the oxygen combustor, the vanadium extraction converter flue gas is completely combusted in an oxygen atmosphere (the equivalent ratio is 1.0) to obtain the first-purity $CO_2$—$N_2$ mixed gas, the first-purity $CO_2$—$N_2$ mixed gas contains about 35% $CO_2$ and the rest is $N_2$ mainly, and the total content of CO and $O_2$ does not exceed 2%; the decarburization converter flue gas is completely combusted in an oxygen atmosphere (the equivalent ratio is 1.0) to obtain the second-purity $CO_2$—$N_2$ mixed gas, the second-purity $CO_2$—$N_2$ mixed gas contains about 80% $CO_2$ and the rest is $N_2$ mainly, the total content of CO and $O_2$ does not exceed 2%, and the first part of the second-purity $CO_2$—$N_2$ mixed gas is used for preparing the first-purity $CO_2$ gas; and the decarburization converter flue gas is subjected to oxygen-excess combustion in an oxygen atmosphere (the equivalent ratio is smaller than 1.0) to obtain $O_2$—$CO_2$—$N_2$ mixed gas, and by adjusting the excess degree of oxygen, the $O_2$—$CO_2$—$N_2$ mixed gas contains about 50% $O_2$, about 40% $CO_2$ and the rest is $N_2$ mainly, and the content of CO is lower than 1%.

The first-purity $CO_2$—$N_2$ mixed gas is used for bottom blowing of the vanadium extraction converter, a second part of $CO_2$—$N_2$ mixed gas with a second concentration is used as a carrier gas for blowing iron ore powder into the vanadium extraction converter, a third part of the second-purity $CO_2$—$N_2$ mixed gas, the $O_2$—$CO_2$—$N_2$ mixed gas and the first-purity $CO_2$ gas are used as a carrier gas for bottom blowing of the decarburization converter and bottom injecting of lime powder into the decarburization converter, and the specific staged control smelting process is as follows:

in the smelting process of the vanadium extraction converter, the first-purity $CO_2$—$N_2$ mixed gas is bottom-blown in the whole process, and the bottom blowing intensity is 0.03 $Nm^3/t/min$;

in the early smelting stage and the middle smelting stage of the vanadium extraction converter, iron ore powder is injected and blown into the converter by taking the second part of the second-purity $CO_2$—$N_2$ mixed gas as a carrier gas, the temperature of the molten bath is stabilized, the gas supply intensity is 0.2 $Nm^3/t/min$, and the iron ore powder supply intensity is 1.0 kg/t/min;

in the later smelting stage of the vanadium extraction converter, blowing of the iron ore powder are stopped, the content of the iron oxide in the vanadium slag is prevented from being too high, the second part of the second-purity $CO_2$—$N_2$ mixed gas is continuously injected and blown, the gas supply intensity is 0.2 $Nm^3/t/min$, stirring of the molten bath is enhanced, the temperature of the molten bath is inhibited from rising too fast depending on the heat absorption effect of $CO_2$, the vanadium oxidation rate is increased, and the iron oxide in the vanadium slag is reduced;

in the early smelting stage and the middle smelting stage of the decarburization converter, when the lime powder is not injected and blown, a third part of the second-purity $CO_2$—$N_2$ mixed gas is bottom-blown, when the lime powder is injected and blown, the $O_2$—$CO_2$—$N_2$ mixed gas is used as a carrier gas to inject and blow the lime powder, excessive growth of a mushroom-shaped loose porous medium area is inhibited by utilizing the heat release effect of $O_2$, blockage of a bottom blowing injecting lance is avoided, the bottom blowing gas supply intensity is 0.8 $Nm^3/t/min$, the bottom blowing powder injecting intensity is 3.0 kg/t/min, the oxygen supply intensity of a top blowing oxygen lance is 2.5 $Nm^3/t/min$, and a top blowing lance height is 3.5 m; and in the later smelting stage of the decarburization converter, in order to prevent the nitrogen content of the molten steel from exceeding the standard, the first-purity $CO_2$ gas and the industrially pure $O_2$ are mixed as bottom blowing gas, the bottom blowing gas supply intensity is 0.8 $Nm^3/t/min$, the top blowing oxygen supply intensity is 2.5 $Nm^3/t/min$, the top blowing lance height is 3.0 m, top blowing oxygen supply is stopped 1.5 min before the end of blowing, and the mixed gas of the first-purity $CO_2$ and the industrially pure $O_2$ is bottom-blown to finish end point control.

Because the stirring effect of $CO_2$ is superior to that of $N_2$ under the condition that the bottom blowing flows are the same, after the first-purity $CO_2$—$N_2$ mixed gas is used as the bottom blowing gas of the vanadium extraction converter, under the condition that the stirring effect of the molten bath is kept unchanged, the number of the bottom blowing air-permeable bricks required for the vanadium extraction converter is reduced from 8 to 6, the bottom blowing intensity is reduced from 0.04 $Nm^3/t/min$ to 0.03 $Nm^3/t/min$, 12 bottom blowing pocket bricks are totally mounted on the bottom of the vanadium extraction converter and are divided into two groups, one group of bottom blowing pocket bricks are used every time, bottom blowing air-permeable bricks are mounted by drilling, bottom blowing stirring is provided, after the group of bottom blowing air-permeable bricks are eroded to a lower safety limit, the group of bottom blowing bricks are blocked by a bottom blowing quick-change mode, the other group of bottom blowing pocket bricks are used, bottom blowing air-permeable bricks are mounted by drilling, bottom blowing stirring is provided, the two groups of bottom blowing pocket bricks are alternately used, and the integral service life of the bottom of the vanadium extraction converter is prolonged on the premise of maintaining the stirring effect of the vanadium extraction converter.

After the method and system are adopted, the vanadium extraction converter flue gas and the decarburization converter flue gas are recycled at high efficiency and low cost, diversified $CO_2$ gas sources are provided for smelting of the vanadium extraction converter and the decarburization converter, different process requirements of the vanadium extraction converter and the decarburization converter are respectively met, the vanadium oxidation rate of the vanadium extraction converter is improved from 89.4% to 92.0%, T.Fe in the vanadium slag is reduced from 32.1% to 29.2%, the average end phosphorus content of the decarburization converter is reduced from 0.018% to 0.012%, and the service lives of the bottom of the vanadium extraction converter and the bottom of the decarburization converter are prolonged by 30% or above.

Embodiment 2

In the embodiment, the method and system are applied to a 150-ton vanadium extraction-decarburization duplex converter process.

The converter flue gas generated by the vanadium extraction converter contains 30% CO, 20% $CO_2$ and the rest is $N_2$, and because the calorific value of the gas is low, before the method and system are adopted, the vanadium extraction converter flue gas is directly diffused; and the decarburization converter flue gas contains 55% CO, 25% $CO_2$ and the rest is $N_2$, and is stored in a gas cabinet. Before the method and system are adopted, nine bottom blowing air-permeable bricks are arranged on the bottom of the vanadium extraction converter, the gas supply intensity is 0.09 $Nm^3/t/min$, four inject lances for blowing the iron ore powder is arranged on a side of the converter, the gas supply intensity is 0.33 $Nm^3/t/min$, the powder injecting intensity is 2.0 kg/t/min, and the carrier gas for bottom blowing and side blowing are $N_2$; and six bottom blowing injecting lances for blowing lime powder are arranged on the bottom of the decarburization converter, pure $O_2$ is used as a carrier gas for injecting powder, the bottom blowing gas supply intensity is 1.0 $Nm^3/t/min$, and the maximum powder injecting intensity is 5.0 kg/t/min.

After the method and system are applied, the vanadium extraction converter flue gas and the decarburization converter flue gas are separately introduced into the oxygen combustor, the vanadium extraction converter flue gas is completely combusted in an oxygen atmosphere (the equivalent ratio is 1.0) to obtain the first-purity $CO_2$—$N_2$ mixed gas, the first-purity $CO_2$—$N_2$ mixed gas contains about 50% $CO_2$ and the rest is $N_2$ mainly, and the total content of CO and $O_2$ does not exceed 2%; the decarburization converter flue gas is completely combusted in an oxygen atmosphere (the equivalent ratio is 1.0) to obtain the second-purity $CO_2$—$N_2$ mixed gas, the second-purity $CO_2$—$N_2$ mixed gas contains about 80% $CO_2$ and the rest is $N_2$ mainly, the total content of CO and $O_2$ does not exceed 2%, and the first part of the second-purity $CO_2$—$N_2$ mixed gas is used for preparing the first-purity $CO_2$ gas; and the decarburization converter flue gas is subjected to oxygen-excess combustion in an oxygen atmosphere (the equivalent ratio is less than 1.0) to obtain the $O_2$—$CO_2$—$N_2$ mixed gas, by adjusting the excess degree of oxygen, the $O_2$—$CO_2$—$N_2$ mixed gas contains about 40% $O_2$, about 48% $CO_2$ and the rest is $N_2$ mainly, and the content of CO is lower than 1%.

The first-purity $CO_2$—$N_2$ mixed gas is used for bottom blowing of the vanadium extraction converter, a second part of $CO_2$—$N_2$ mixed gas with a second concentration is used as a carrier gas for blowing the iron ore powder into the vanadium extraction converter, a third part of the second-purity $CO_2$—$N_2$ mixed gas, the $O_2$—$CO_2$—$N_2$ mixed gas and the first-purity $CO_2$ gas are used as a carrier gas for bottom blowing of the decarburization converter and bottom injecting of the lime powder into the decarburization converter, and the specific staged control smelting process is as follows:

in the smelting process of the vanadium extraction converter, the first-purity $CO_2$—$N_2$ mixed gas is bottom-blown in the whole process, and the bottom blowing intensity is 0.06 $Nm^3$/t/min;

in the early smelting stage and the middle smelting stage of the vanadium extraction converter, the second part of the second-purity $CO_2$—$N_2$ mixed gas is used as a carrier gas for blowing the iron ore powder into the converter, the temperature of the molten bath is stabilized, the gas supply intensity is 0.33 $Nm^3$/t/min, and the iron ore powder supply intensity is 2.0 kg/t/min;

in the later smelting stage of the vanadium extraction converter, blowing of the iron ore powder are stopped, the content of iron oxide in the vanadium slag is prevented from being too high, the second part of the second-purity $CO_2$—$N_2$ mixed gas is continuously injected and blown, the gas supply intensity is 0.33 $Nm^3$/t/min, stirring of the molten bath is enhanced, the temperature of the molten bath is inhibited from rising too fast depending on the heat absorption effect of $CO_2$, the vanadium oxidation rate is increased, and the iron oxide in the vanadium slag is reduced;

in the early smelting stage and the middle smelting stage of the decarburization converter, when the lime powder is not injected and blown, the third part of the second-purity $CO_2$—$N_2$ mixed gas is bottom-blown, when the lime powder is injected and blown, the $O_2$—$CO_2$—$N_2$ mixed gas is used as a carrier gas for blowing the lime powder, excessive growth of the mushroom-shaped loose porous medium area is inhibited by utilizing the heat release effect of $O_2$, blockage of a bottom blowing injecting lance is avoided, the bottom blowing gas supply intensity is 1.0 $Nm^3$/t/min, the bottom blowing powder injecting intensity is 5.0 kg/t/min, the oxygen supply intensity of the top blowing oxygen lance is 3.0 $Nm^3$/t/min, and the top blowing lance height is 4.0 m; and in the later smelting stage of the decarburization converter, in order to prevent the nitrogen content of molten steel from exceeding the standard, the first-purity $CO_2$ gas and the industrially pure $O_2$ are mixed to serve as bottom blowing gas, the bottom blowing gas supply intensity is 1.0 $Nm^3$/t/min, the top blowing oxygen supply intensity is 3.0 $Nm^3$/t/min, the top blowing lance height is 3.5 m, top blowing oxygen supply is stopped 1.0 min before the end of blowing, and the mixed gas of the first-purity $CO_2$ and the industrially pure $O_2$ is bottom-blown to finish end point control.

Because the stirring effect of $CO_2$ is superior to that of $N_2$ under the condition that the bottom blowing flows are the same, after the first-purity $CO_2$—$N_2$ mixed gas is used as the bottom blowing gas of the vanadium extraction converter, under the condition that the stirring effect of the molten bath is kept unchanged, the number of bottom blowing air-permeable bricks required for the vanadium extraction converter is reduced from 9 to 6, the bottom blowing intensity is reduced from 0.09 $Nm^3$/t/min to 0.06 $Nm^3$/t/min, twelve bottom blowing pocket bricks are mounted on the bottom of the vanadium extraction converter totally, and are divided into two groups, one group of bottom blowing pocket bricks are used every time, bottom blowing air-permeable bricks are mounted by drilling, bottom blowing stirring is provided, after the group of bottom blowing air-permeable bricks are eroded to a lower safety limit, the group of bottom blowing bricks are blocked by a bottom blowing quick-change mode, the other group of bottom blowing pocket bricks are used, bottom blowing air-permeable bricks are mounted by drilling, bottom blowing stirring is provided, the two groups of bottom blowing pocket bricks are used alternately, and the integral service life of the bottom of the vanadium extraction converter is prolonged on the premise of maintaining the stirring effect of the vanadium extraction converter.

After the method and system are adopted, the vanadium extraction converter flue gas and the decarburization converter flue gas are recycled at high efficiency and low cost, diversified $CO_2$ gas sources are provided for smelting of the vanadium extraction converter and the decarburization converter, different process requirements of the vanadium extraction converter and the decarburization converter are respectively met, the vanadium oxidation rate of the vanadium extraction converter is improved from 90.3% to 92.8%, T.Fe in the vanadium slag is reduced from 30.8% to 28.3%, the average end phosphorus content of the decarburization converter is reduced from 0.016% to 0.009%, and the service lives of the bottom of the vanadium extraction converter and the bottom of the decarburization converter are prolonged by 20% or above.

It should be understood that the specific embodiments described below are merely illustrative of the present disclosure and are not intended to be limiting the present disclosure. Any modification, equivalent replacement, improvement and the like made according to the spirit and principle of the present disclosure shall be regarded as within the protection scope of the present disclosure.

The invention claimed is:

1. A method for vanadium extraction from molten iron, comprising:
   smelting a molten iron in a vanadium extraction converter;
   smelting a vanadium-depleted molten iron from the vanadium extraction converter in a decarburization converter;
   combustion on combusting a flue gas from the vanadium extraction converter to obtain a first $CO_2$—$N_2$ mixed gas having a first purity;
   combusting a flue gas from the decarburization converter to obtain a second $CO_2$—$N_2$ mixed gas having a second purity;
   combusting a flue gas from the decarburization converter flue gas to obtain an $O_2$—$CO_2$—$N_2$ mixed gas;
   purifying a first portion of the second $CO_2$—$N_2$ mixed gas in a purification device to obtain a $CO_2$ gas;
   bottom blowing the vanadium extraction converter with the first $CO_2$—$N_2$ mixed gas;
   blowing iron ore powder into the vanadium extraction converter with a second portion of the second $CO_2$—$N_2$ mixed gas; and
   bottom blowing the decarburization converter and/or bottom injecting lime powder into the decarburization converter with a mixture of a third portion of the second $CO_2$—$N_2$ mixed gas, the $O_2$—$CO_2$—$N_2$ mixed gas, and the $CO_2$ gas.

2. The method according to claim 1, wherein
the smelting process of the vanadium extraction converter comprises a first smelting stage, a second smelting stage, and a third smelting stage,
wherein the first $CO_2$—$N_2$ mixed gas is bottom blown into the vanadium extraction converter at an intensity of 0.03-0.3 $Nm^3$/t/min throughout the smelting process in the vanadium extraction converter;
wherein, in the first smelting stage and the second smelting stage in the vanadium extraction converter, the second stream of the second $CO_2$—$N_2$ mixed gas blows iron ore powder into the vanadium extraction converter at an intensity of 0.1-0.5 $Nm^3$/t/min, and an iron ore powder intensity of 0-2 kg/t/min;
wherein, in the third smelting stage in the vanadium extraction converter, the second portion of the second $CO_2$—$N_2$ mixed gas continuously blows into the vanadium extraction converter at an intensity of 0.1-0.5 $Nm^3$/t/min;
wherein the smelting process in the decarburization converter comprises a first smelting stage, a second smelting stage, and a third smelting stage,
wherein, in the first smelting stage and the smelting second stage in the decarburization converter, when the lime powder is not blown, the third portion of the second $CO_2$—$N_2$ mixed gas is bottom blown into the decarburization converter; when the lime powder is blown, the lime powder is blown into the decarburization converter using the $O_2$—$CO_2$—$N_2$ mixed gas as a carrier gas at an intensity of 0.5-1.5 $Nm^3$/t/min and a lime powder intensity of 0-5 kg/t/min; and
in the third smelting stage in the decarburization converter, the decarburization converter is bottom blown using a mixture of the $CO_2$ gas and industrial pure $O_2$ at a gas supply intensity 0.5-1.5 $Nm^3$/t/min.

3. The method according to claim 2, wherein,
the $CO_2$—$N_2$ mixed gas comprises 30-50% by volume of $CO_2$, 50-70% by volume of $N_2$, and not higher than 2% by volume of $O_2$ and CO;
the second $CO_2$—$N_2$ mixed gas comprises 50-80% by volume of $CO_2$, 20-50% by volume of $N_2$, and not higher than 2% by volume of $O_2$ and CO;
the $O_2$—$CO_2$—$N_2$ mixed gas comprises 20-60% by volume of $O_2$, 20-65% by volume of $CO_2$, 10-40% by volume of $N_2$, and less than 0.1% by volume of CO; and
in the $CO_2$ gas, comprises more than 99% by volume of $CO_2$ and less than 1% $O_2$ and CO.

4. The method according to claim 1, wherein the vanadium extraction converter comprises two or three groups of bottom blowing bricks, wherein the two or three groups of bottom blowing bricks are alternately in service so that only one among two or three groups of bottom blowing bricks is in service at one time.

\* \* \* \* \*